(12) United States Patent
Zhou et al.

(10) Patent No.: US 9,435,991 B2
(45) Date of Patent: Sep. 6, 2016

(54) MANIPULATION OF TOPOGRAPHY OF LARGE-FORMAT GLASS SLIDES

(71) Applicant: DMetrix, Inc., Tucson, AZ (US)

(72) Inventors: Pixuan Zhou, Tucson, AZ (US); Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 428 days.

(21) Appl. No.: 13/799,068

(22) Filed: Mar. 13, 2013

(65) Prior Publication Data
US 2013/0242384 A1 Sep. 19, 2013

Related U.S. Application Data

(60) Provisional application No. 61/611,544, filed on Mar. 15, 2012.

(51) Int. Cl.
G02B 21/26 (2006.01)
G02B 21/36 (2006.01)

(52) U.S. Cl.
CPC .............. *G02B 21/26* (2013.01); *G02B 21/367* (2013.01)

(58) Field of Classification Search
CPC .... G02B 21/241; G02B 21/26; G02B 21/32; G02B 21/34; G02B 21/367; G01B 11/026; G01B 11/24; G01B 11/25; G01B 11/254; G01B 11/30; G01B 11/306; G01B 9/04; G01N 1/28; G01N 1/36; G01N 2001/366; G01N 21/0303; B22D 18/06; G01M 11/025; G01M 11/0207; G01M 11/0214; G03F 9/00; G03F 9/70; G03F 9/7003; G03F 9/7015; G03F 9/7023; G03F 9/7026; G03F 9/703; G03F 9/7034; H01L 21/68; H01L 21/681; H01L 21/67259; H01L 21/67265; H01L 21/6835; H01L 21/6838; H01L 21/68735
USPC .......... 356/2, 600, 601, 614, 624, 429, 431, 356/237.1, 239.1, 239.7, 237.5
See application file for complete search history.

(56) References Cited

U.S. PATENT DOCUMENTS 5,202,748 A * 4/1993 MacDonald et al. ......... 356/508
8,914,143 B1 * 12/2014 Kaskey et al. ................ 700/114
2007/0236857 A1 * 10/2007 Lin et al. ...................... 361/234

* cited by examiner

*Primary Examiner* — Stephone B Allen
*Assistant Examiner* — Adam W Booher
(74) *Attorney, Agent, or Firm* — Yakov Sidorin; Quarles & Brady LLP

(57) ABSTRACT

System and method for correcting a topography of an object being imaged by a multi-array microscope system. The object is forced to conform to a surface of the substrate supporting the object with a suction force and the topography of the chosen object surface is determined. The supporting substrate is bent with the use of force applied to the substrate with at least one actuator such as to reduce the deviations of the determined topography of the object's surface from a pre-determined reference surface by transferring the changes in the curvature of the supporting substrate to the object. In particular, the chosen surface of the object can be substantially flattened for ease of simultaneous imaging of this surface with multiple objectives of the multi-array microscope.

19 Claims, 5 Drawing Sheets

MANIPULATION OF TOPOGRAPHY OF LARGE-FORMAT GLASS SLIDES

CROSS-REFERENCE TO RELATED APPLICATIONS

This application claims the benefit of and priority from the U.S. Provisional Patent Application No. 61/611,544 filed on Mar. 15, 2012 and titled "Method for Manipulating the Topography of Large-Format Glass Slides", the entire contents of which are hereby incorporated by reference for all purposes.

TECHNICAL FIELD

The present invention relates to an array microscope and, more particularly, to modification of the topography of an object that is simultaneously imaged with multiple objectives of the array microscope.

BACKGROUND ART

Multi-axis imaging systems such as array microscopes, in which a plurality of optical elements are movable in unison and arranged in an array so as to image respective portions of a common object, have been discussed in, for example, U.S. Pat. Nos. 6,842,290; 6,958,464; 7,061,584; 7,482,566; and 7,864,369. As the topography of an object (such as a surface) being imaged does not necessarily fall within the depth of focus range of the array of objectives Multiple objective are concurrently translated along an optical axis to simultaneously image different portions of the object. However, when topography of the object is such that some portions of the object being imaged are not within the depth of focus of the corresponding objective, at least some of the images produced by the array microscope are blurred. Since topography of a given object is often unpredictable and may erratically deviate from an imaged surface on which the objectives are focused, there is a need for system and method for correction of deviations of object topography to conform to the imaged surface.

SUMMARY OF THE INVENTION

An embodiment of the present invention provides a microscope system for imaging an object, which includes a supporting substrate dimensioned to hold the object on a first surface thereof and having an outlet and a channel fluidly connecting the outlet and the first surface; first and second microscope objectives simultaneously moveable (during imaging of the object) along an axis to provide concurrent imaging of the object; and a set of actuators connected to a second surface of the supporting substrate and enabled to apply force to the second surface to change its curvature such as to enable flattening of a surface of the object. The system may optionally include a processor programmed to govern an operation of at least one actuator from the set in response to assessment of imaging data representing topography of the object and acquired by simultaneously scanning the object along the axis with the first and second objectives.

A related embodiment provides a microscope system for imaging an object, which contains multiple objectives operably connected to enable simultaneous through-focus scanning of the object along an optical axis and a supporting substrate dimensioned to hold the object on a first surface of the supporting substrate and equipped to force a first surface of the object to substantially conform to the first surface of the supporting substrate as a result of applying a suction force through the substrate to the surface of the object. The system further includes a means for changing a curvature of a second surface of the supporting substrate when being brought up in contact with the second surface; and a tangible non-transitory computer-readable storage medium with a computer-readable program product thereon. The tangible storage medium is operably connected with at least one of the means for enabling and the multiple objectives, and the computer-readable program product includes (i) program code for storing, on said storage medium, imaging data representing the simultaneous scanning of the object; and (ii) program code for determining corrective data based on the imaging data, where the corrective data represents a map of change of curvature of the second surface. The multiple objectives of the system may be spatially cooperated such that their corresponding principal planes are repositioned simultaneously during the imaging of the object. Furthermore, the means for changing a curvature may include a set of actuators (the set containing one or more actuators) mechanically cooperated with the second surface of the supporting substrate at first ends thereof. The set of actuators may be anchored in an anchoring frame and enables application of positive or negative pressure to the second surface of the supporting substrate.

A related embodiment provides a system for support of an object for use with an imaging system that enables simultaneous imaging of the object with multiple objectives. The system for support includes a supporting substrate dimensioned to hold the object on a first surface thereof during imaging; and a means operably cooperated with the supporting substrate to enable bending the supporting substrate in response to assessment of data representing a through-focus concurrent scan of the object with multiple objectives. In a specific implementation, the means includes first and second actuators each configured to contact a second surface of the supporting substrate to apply force to the second surface, and the supporting substrate contains a means for forming negative air pressure at the first surface to enable a surface of the object to conform to the first surface.

Another implementation of the invention provides a method for correcting a topography of a surface of an object, which includes disposing the object on a surface of a supporting substrate having a fluid port and structured to fluidly connect the surface with the port; and scanning the object through focus with first and second objectives concurrently to determine differences between the topography of the surface of the object and a reference surface. The method further includes bending the supporting substrate to reduce the determined differences.

BRIEF DESCRIPTION OF THE DRAWINGS

The invention will be more fully understood by referring to the following Detailed Description in conjunction with the Drawings, of which.

DETAILED DESCRIPTION

Figure 1:
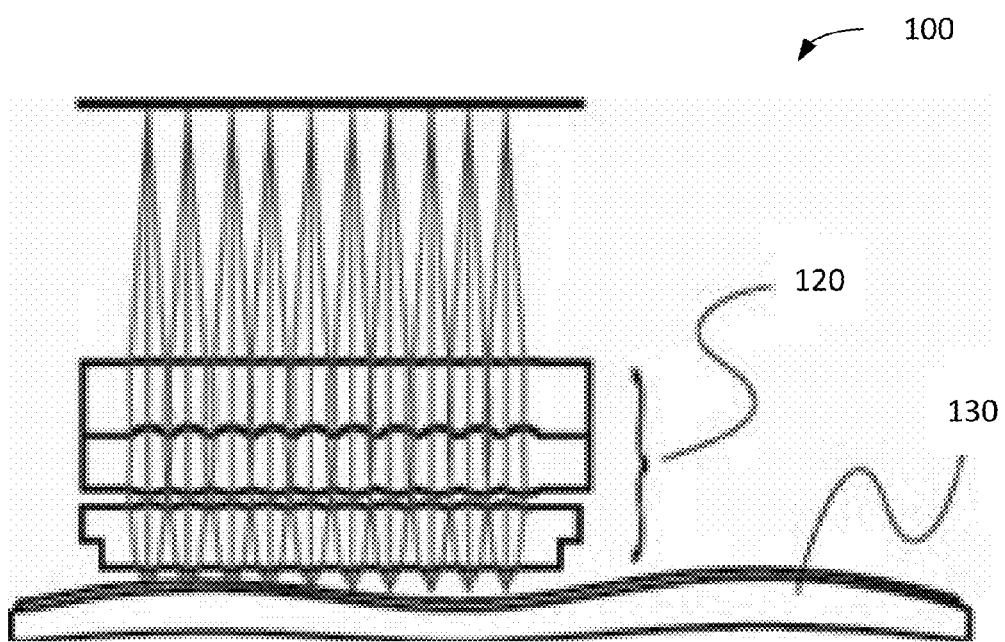
FIG. 1 is a diagram illustrating the deviating from being flat topography of a slide used in conjunction with an array microscope.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. No single drawing is intended to support a complete description of all features and details of the invention. Nevertheless, the presence of such details and feature in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole.

Large-format glass slides are often used for mounting large-format tissue section to be imaged using a microscope. Typical 1 to 2 mm thick glass slides are rectangular in shape with transverse dimensions of about 1 inch by about 3 inches, but can be as big as about 6 inches by about 8 inches. One of the challenges associated with imaging large-format tissue slides is the fact that most of the large-format glass slides (and cover glasses) are not "perfectly" flat. For the purposes of this disclosure and the appended claims, the term "slide" is used to refer to glass slide with cover glass, unless otherwise noted.

The topography of typical large-format slides of glass used to support and/or fix the tissue sample being imaged with the microscope system exhibits low spatial frequency height variation or fluctuations contributed both by the glass slide and the cover glass. While the spatial frequency and magnitude of the surface height variations depend on the size of the slide and change among the slides produced by different manufacturers, empirical measurements reveal typical height fluctuations to have spatial periods of about 1 inch and shorter and under one inch spatial period and amplitude can be in excess of 50 microns. The amplitudes of these height variations are typically greater than the depth of focus (DOF) of a high numerical aperture (NA) microscope objective used for imaging, which is calculated according to $$DOF = (n\lambda)/NA^2,$$

where $\lambda$ is the operating wavelength of light and n is the index of refraction of the object space.

Similarly, and independently from the topography of the glass slide, a sample of tissue prepared for imaging may be geometrically non-uniform and also have a surface characterized by surface relief having height fluctuations. When imaging an object (whether the glass slide by itself or a glass slide with the tissue sample mounted) using a conventional microscope with a single objective, this type of low spatial frequency height fluctuation associated with the imaged surface of the object can be mitigated by continuously adjusting the object distance between the slide and the objective. However, when imaging is carried out with the use of a so-called array microscope having multiple microscope objectives that are mechanically coupled together and that are used for simultaneous imaging of the object, independent adjustment of the object distance may not be possible. In this case, the physical dimension of the array microscope is large relative to the period and/or the amplitude of the height variation of the surface(s) of the slide and, consequently, at least some optical channels of the array microscope may be out of focus. As a result, maintaining optimal, focused imaging conditions across the entire area of the imaged tissue sample becomes problematic and results in an image that is blurred in at least some areas.

In accordance with preferred embodiments of the present invention, methods and apparatus are disclosed for addressing the above-mentioned shortcoming of imaging of a sample with an array microscope by manipulating the topography of the slide to reduce the height variations of the slide surface(s).

FIG. 1 illustrates schematically a microscope system 100 employing an array of mechanically connected and simultaneously operated objectives 120, which is used for imaging large areas of tissue sample at high speeds. In the ideal case when all foci of the objective 120 are located in the same plane, the deviations of a surface of an object (shown as slide 130) from being ideally flat prevent the microscope system 100 from achieving optimal imaging conditions for each of its objectives simultaneously. More generally, the sub-optimal imaging conditions result when the height deviations of the object's surface being images that cause at least a portion of the surface to not fall within the DOF of a corresponding objective.

Embodiments of the present invention stem from the realization that relief features or surface configuration of an area of the imaged object (in other words, it its topography) depend at least in part on its orientation with respect to the multiple objectives. In particular, when stress is applied to the slide to change its curvature, then period(s) and/or amplitude(s) characterizing the height fluctuations of the stress-free object are changed. As typical glass slides are relatively thin compared to their transverse dimensions, the slides are relatively easily bendable. According to an embodiment of the invention, the topography of the slide and/or object being imaged is modified by bending the slide within the range that substantially does not distort the tissue sample mounted on the slide.

Figure 2:
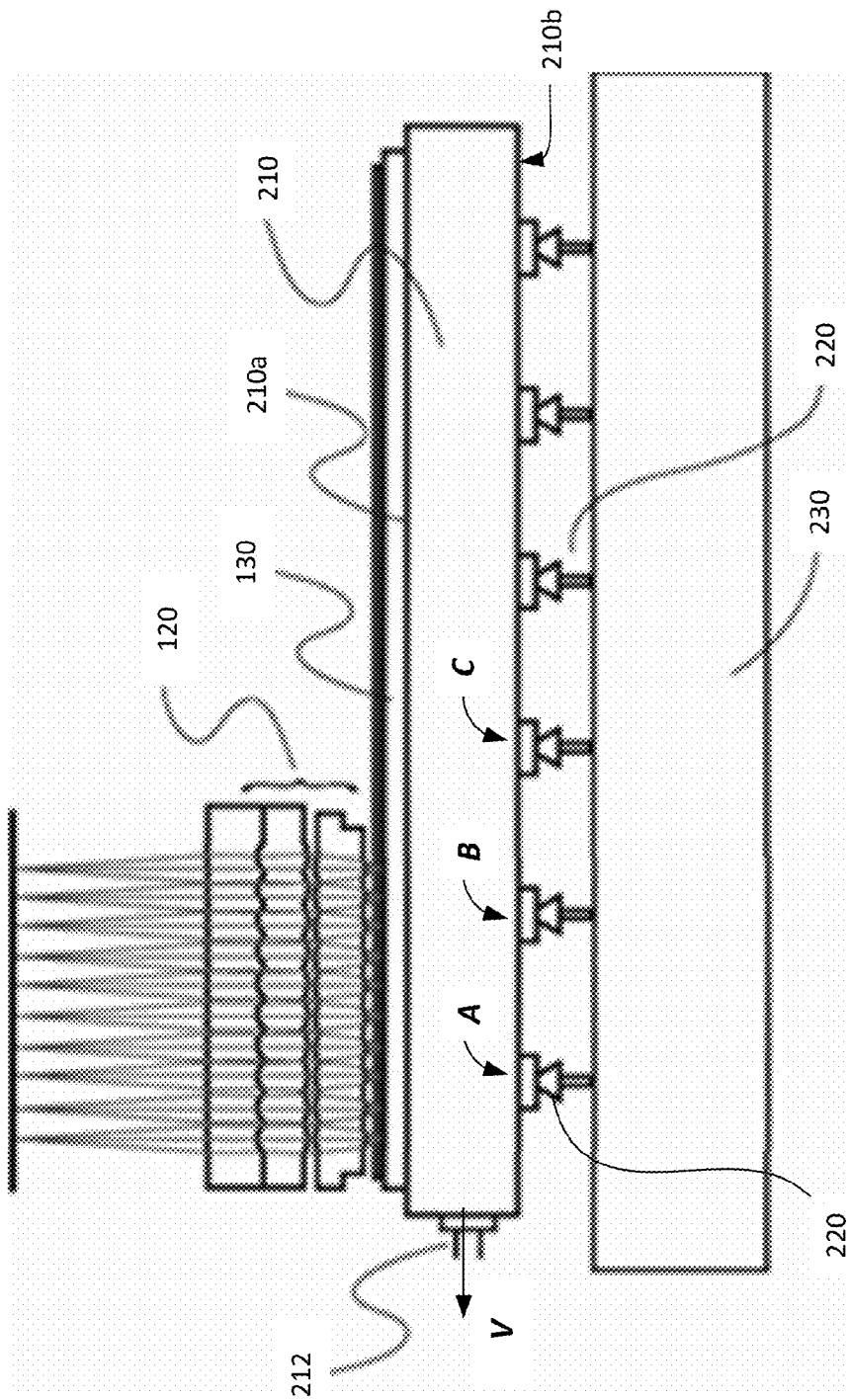
FIG. 2 schematically shows a side view of a system of the invention.

Referring to FIG. 2, providing a diagram illustrating one embodiment of the invention, the slide 130 is mounted under the array of microscope objectives 120 on an upper, reference surface 210a of a supporting substrate 210 and held in position by a suction force V applied via a fluid port 212 (adapted to transfer gas or liquid, for example) through a set of channels (not shown) in the substrate 210 fluidly connecting the port 212 to the backside of the slide. The reference substrate 210 is sufficiently rigid and stiff in comparison with the slide 130 so that when the suction is applied, the negative fluid pressure (for example, gas pressure or liquid pressure) is applied to the back (lower) side of the slide 130. The lower side of the slide 130 is forced by such negative pressure to substantially conform to the topography of the reference surface 210a, which is adapted in its stress-free state to have a surface with pre-determined, initial topography. The pre-determined reference surface topography may be that of a substantially flat and smooth surface, or be characterized by a chosen curvature, for example.

The initial topography of the reference surface 210a can be changed, for example by locally bending the substrate 210 with at least one actuator 220 (as shown—with a multitude of piezoelectric actuators) enabled to apply optionally variable force by pulling or pushing the substrate's surface in one or more predetermined locations (such as locations A, B, C . . . ). As the topography of the reference surface 210a is changed, the slide 130 that has conformed to the reference surface is bent accordingly thereby causing the topography of a surface of the slide 130 to vary.

Bending the reference substrate 210 accompanies overcoming its stiffness. Stiffness of the reference substrate 210 that is chosen to be a plate made of a given material normally increases cubically with the thickness of the substrate. (Therefore, a desired change in stiffness figure of merit of the reference substrate 210 above and beyond the value of stiffness of the slide 130 can be achieved by simply varying the substrate's thickness.) The stiffer the substrate 210, however, the higher the force that has to be applied by the actuators to the substrate to deform it. Based on empirical measurements, in order to enable the operably sufficient conforming of the slide 130 to the reference surface 210a, it is preferred that the stiffness ratio (defined as a ratio of a stiffness figure of merit of the reference substrate 210 to the stiffness figure of merit of the slide 130) be above 100.

Referring again to FIG. 2, the substrate 210 is structured to host a network of channels connecting the fluid (for example, liquid or gas) port 212 with the upper surface 210a such as to establish fluid communication between the port 212 and the surface 210a (when a fluid, which includes liquid and/or gas can propagate through the channels therebetween). In one implementation, for example, at least some of the channels are machined in and/or distributed along the reference surface 210a with such spatial density that is sufficient to achieve good fluid-suction-enabled attachment between the slide 120 and the surface 210a. In such a case, the substrate materials may include metals (such as aluminum, steel, for example) or be non-metallic (such as hard glass or ceramic). In an alternative implementation, the substrate 210 is fabricated from a porous material (such as porous copper, porous carbon, and porous polymers, for example), through the natural micro-channels and/or pores of which the influence of suction-caused force is extended or distributed over the entire backside of the slide 130. The use of a porous material may enable substantially uniform spatial distribution of suction-caused force over the backside of the slide 130.

Figure 3:
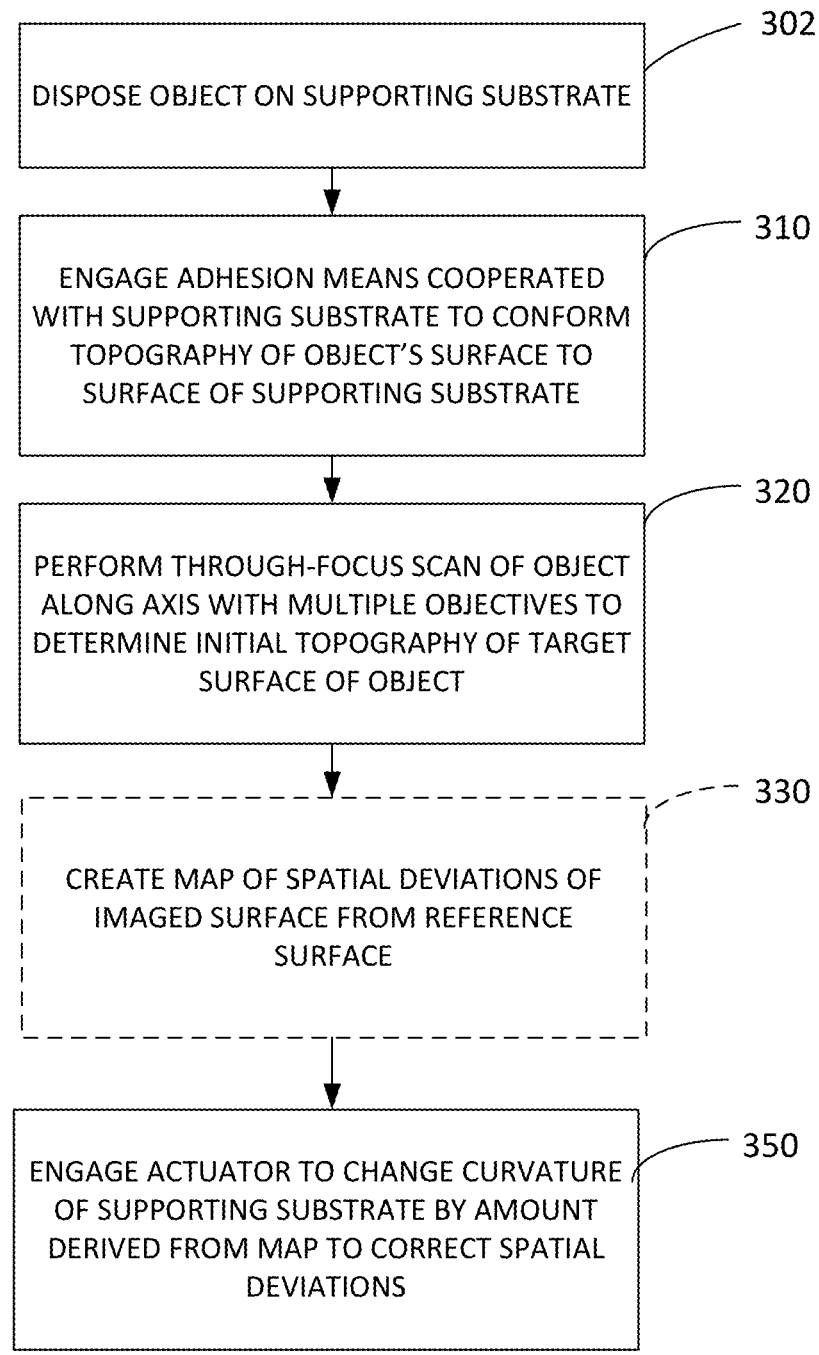
FIG. 3 is a flow-chart describing an embodiment of the method of the invention.

As stated above in reference to FIG. 2, the height variation of a slide's surface is mitigated by applying a suction force to the back side of the slide 130 against a reference surface 210a. The topography of a slide's surface is manipulated with a set of actuators 220 that are anchored to a rigid support frame element 230 and juxtaposed to the back (lower as shown) side 210b of the support substrate 210. An embodiment of the method for manipulation of the slide topography is illustrated in FIG. 3. After the slide is disposed on the supporting substrate 210 at step 302, the adhesion means cooperated with the substrate (such as vacuum suction unit) is turned on at step 310 and, as a result, the back surface of the slide 130 is substantially conformed to the initial topography of the reference surface 210a. At step 320, a set of through-focus scans of the slide 130 is performed (along optical axes of the objectives 120) with the use of an objective-array microscope system 100 to determine the initial topography of an object (for example, a surface associated with the slide or with the tissue sample being imaged). The initial object topography is calculated, for example, based on empirical data representing positions of the objectives, which correspond to optimal imaging of the object through each of these objectives ("best focus" positions). Optionally, the scan data are collected and processed during or after the through-focus scan, at step 330, by a specifically-programmed for this purpose processor of the system 100 (not shown) to create a two-dimensional map of best focus positions across the xy-area of the imaged object. For large-section slides, a through-focus scan can be performed multiple times to cover the complete area of the object and to stitch the topographic maps describing smaller portions of the object. When determined in this fashion, the object topography accounts for height variations in the slide and, when the topography of the object itself deviates from the reference surface, for the deviations of the object topography as well. As a result of the concurrent multiobjective scan of the object, differences between the topography of the chosen surface of the object and a chosen reference surface (for example, a plane) are determined.

The processor of the system is additionally enabled to calculate corrections to the topography of the reference surface 210a of the supporting substrate 210 that have to be introduced in order to change the initial object topography to the desired, target topography. Based on the corrections calculated at step 330 (and expressed, for example, as a map of shifts of the object along the z-axis, required to flatten the object) as a function of the transverse coordinates (for example, coordinates corresponding to the points of contact between the substrate 210 and the actuators 220), the actuators are appropriately axially moved, at step 350, to push and/or pull the substrate 210 thereby deforming or bending the surface 210b as compared to its initial state. The deformation of the surface 210a is transferred through the stiff plate 210 to deform the reference surface 210a and, accordingly, the slide 130 adhered to the reference surface. The actuator-induced slide deformation at least reduces and, preferably, cancels out the existing height variations of the slide topography, thereby reducing the determined differences between the topography of the object and that of a chosen surface (and, in a specific implementation, flattening the object) for further imaging with the microscope system 100. Another step of imaging the so-modified surface of the object may then follow.

Figure 4A:
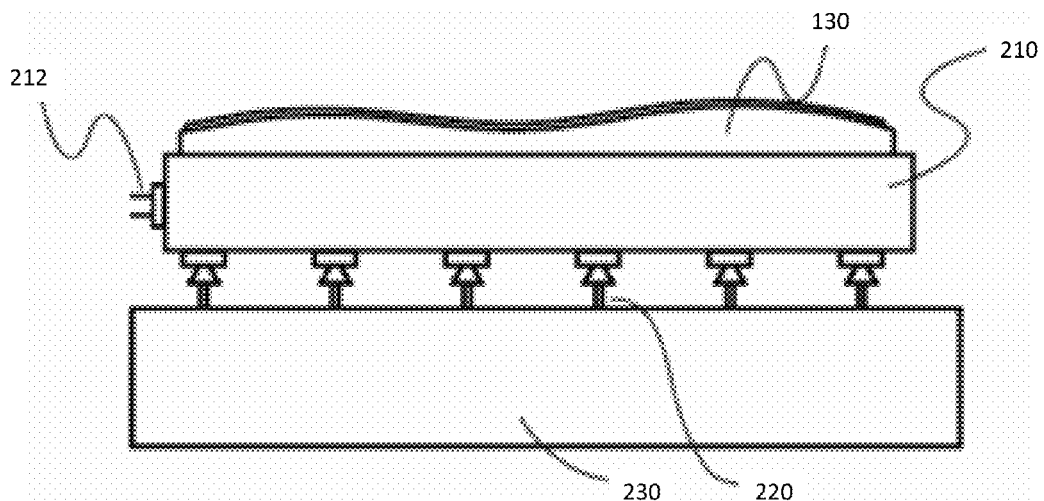
FIG. 4A is a diagram of a portion of the system showing the topography of the slide, conformed to the reference substrate as a result of application of vacuum, prior to the process of topography manipulation.
Figure 4B:
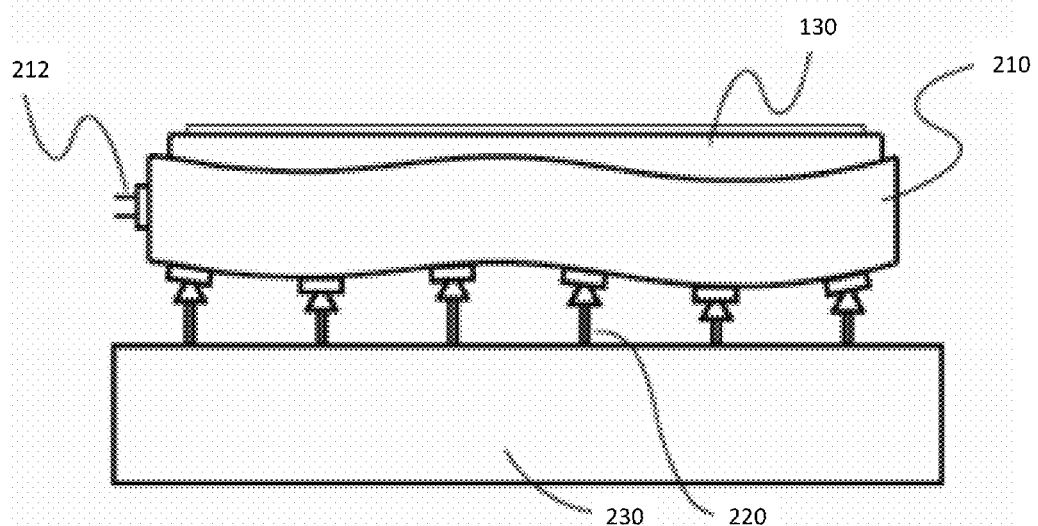
FIG. 4B is a diagram of the portion of the system shown in FIG. 4A illustrating the topography of the slide that has been corrected as a results result of the process of topography manipulation.

FIGS. 4A and 4B provide schematic illustrations to the process of manipulation of the slide topography. As shown in FIG. 4A, in the default, initial state the back surface of the slide 130 is conformed to the reference surface 210a (as shown, flat) of the supporting substrate 210. A surface of the object being imaged and associated with the slide 130 is not flat at least as a result of height variations in the slide 130. After a corrective action is applied to the slide 130 by axially pushing and/or pulling the substrate 210 with the use of actuators 220, the topography of the object surface being imaged is changed to substantially flat. As the actuators 220 are anchored in the rigid frame element 230, in practice at least a small portion of the actuating force created by the actuators 220 is transferred to the frame element 230 as well. Empirical data indicate that such force transfer can be substantially neglected in operation when the stiffness of the frame element 230 exceeds the stiffness of the supporting substrate 210 by about two orders of magnitude.

Figure 5:
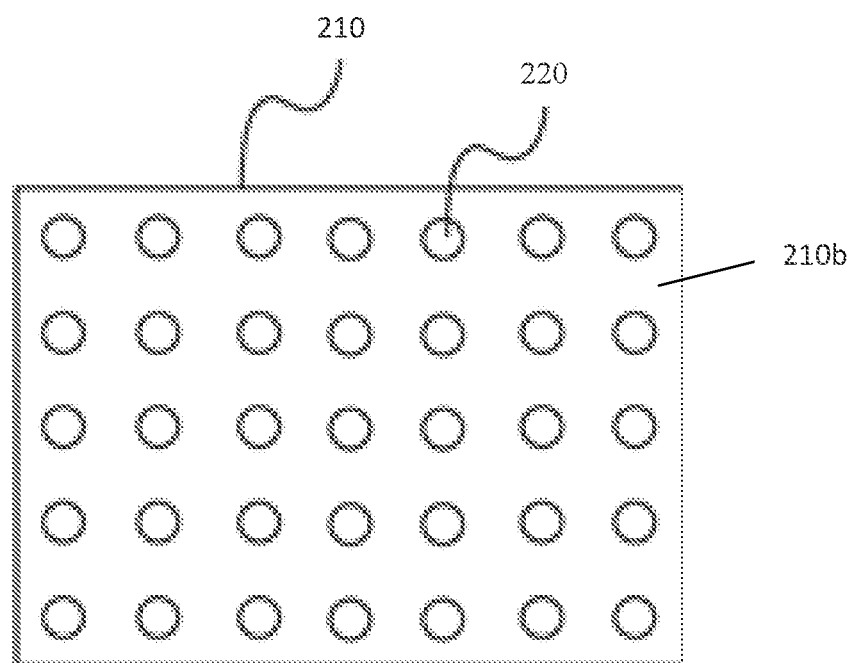
FIG. 5 illustrates a footprint of an equally-spaced two-dimensional rectangular actuator array for use, in accordance with an embodiment of the invention, with large-scale reference substrate and slide.

Spatial cooperation of the actuators 220 and the supporting substrate 210 can vary. In one implementation, the actuators are imposed onto the surface 210b in a pattern corresponding to a two-dimensional equally spaced rectangular array shown in FIG. 5. The number of actuators 220, the density of contact points (A, B, C and the like) between the actuators and the substrate 210 can be pre-determined to increase or decrease the spatial resolution with which the corrective force can be transferred to the slide 130. For example, the higher the number of actuators 220, the higher the spatial frequency of the slide's height fluctuation that can be addressed with the use of an embodiment of the invention. For the spatial frequencies characterizing height variation of typically used large section glass slides, the spatial density of one actuator per about one square inch may be sufficient.

The actuators can be controlled in a modal fashion, when the actuators are activated collectively, as an array, to enable corrections of eigenmodes in which bending of the supporting substrate can be expressed. The slide's surface topography is expressed as a series of these eigenmodes and the actuators are commenced to correct these eigenmodes. In a related embodiment, the required corrections can be expressed in terms of Zernike polynomials. Alternatively, the actuators 220 can be controlled individually to provide zonal correction to manipulate the slide's topography in a predetermined portion or area of the slide.

In accordance with several examples of embodiments, a system and method of the present invention have been discussed. The skilled artisan will appreciate that deviations from and modifications to the system and method can be introduced that are within the scope of the invention. For example, when channels connecting the upper surface 210a of the substrate 210 of FIG. 2 with the port are filled not with air but liquid, the suction force holding the object on the surface 210a and causing the lower surface of the object to confirm to the surface 210a may be caused by creating a negative pressure of liquid through the port 212.

It is appreciated that a system of the invention additionally includes an optical detector acquiring optical data representing the surface of the object of interest through at least one of the optical objectives and, optionally, a processor that selects and processes data received from the detector and, optionally, from the electronic circuitry that may be employed to automate the operation of the actuators of the system. Accordingly, implementation of a method of the invention can employ a processor controlled by instructions stored in a tangible memory to perform the steps of operation of the system described above. The memory may be random access memory (RAM), read-only memory (ROM), flash memory or any other memory, or combination thereof, suitable for storing control software or other instructions and data. In an alternative embodiment, the disclosed system and method may be implemented as a computer program product for use with a computer system. Such implementation includes a series of computer instructions fixed either on a tangible non-transitory medium, such as a computer readable medium (for example, a diskette, CD-ROM, ROM, or fixed disk) or transmittable to a computer system, via an interface device (such as a communications adapter connected to a network over a medium). Some of the functions performed during the execution of the method of the invention have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. In addition, while the invention may be embodied in software such as program code, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Accordingly, the invention should not be viewed as being limited to the disclosed embodiment(s).

What is claimed is:

1. A method for correcting a topography of a surface of an object, the method comprising:
   disposing the object on a first surface of a supporting substrate, the supporting substrate having a second surface opposite to the first surface, the supporting substrate having a fluid port and structured to fluidly connect the first surface with the port through a body of the supporting substrate;
   measuring the object to determine differences between the topography of an upper surface of the object and a reference surface; and
   deforming the supporting substrate to change curvatures of both the first and second surfaces and to reduce said differences.

2. A method according to claim 1, wherein the measuring includes scanning the object through focus.

3. A method according to claim 1, further comprising engaging a fluid connection between the fluid port and the first surface to apply suction force to the object to hold the object at the first surface.

4. A method according to claim 1, wherein the disposing includes positioning the object on the supporting substrate such as to substantially conform a surface of the object to the first surface of the supporting substrate.

5. A method according to claim 1, wherein the scanning measuring includes scanning the object through focus with first and second objectives concurrently.

6. A system for support of an object for use with an imaging system configured to enable simultaneous imaging of the object with multiple objectives, the system for support comprising:
   a supporting substrate having a first surface and a second surface opposing the first surface and dimensioned to hold the object on the first surface thereof during imaging; and
   a first set of actuators operably cooperated with the supporting substrate to cause bending the first and second surfaces of the supporting substrate in response to assessment of data representing a measured topography of the object.

7. A system for support according to claim 6, further comprising a second set of actuators, each of the first and second sets of actuators being configured in contact with the second surface of the supporting substrate to apply force thereto.

8. A system for support according to claim 6, further comprising a processor programmed to enable said first set of actuators to apply force to predetermined locations of the second surface of the supporting substrate in response to assessment of data representing a through-focus scan of the object with multiple objectives.

9. A system for support according to claim 6, wherein the supporting substrate contains a fluid port and a channel fluidly connecting the first surface with the fluid port through the body.

10. A microscope system for imaging an object, the system comprising:
a supporting substrate having a body with first and second surfaces and dimensioned to hold the object on the first surface and further having an outlet and a channel fluidly connecting the outlet and the first surface through the body;
first and second microscope objectives simultaneously moveable, during imaging of the object, along an axis to provide concurrent imaging of the object that has been disposed on the first surface;
a set of actuators connected to the second surface of the supporting substrate and configured to apply force to said second surface to change curvatures of the first and second surfaces to cause flattening of a surface of the object.

11. A microscope system according to claim 10, further comprising a processor programmed to govern an operation of at least one actuator from the set in response to assessment of imaging data representing a topography of the object and acquired by simultaneously scanning the object along the axis with the first and second objectives.

12. A microscope system according to claim 11, wherein the processor is further programmed to create a map of values representing deviations of the topography of the object from a reference topography.

13. A microscope system according to claim 10, wherein the at least one actuator from the set is configured to bend the first and second surfaces of the supporting substrate to reduce a deviation of the topography of the object from a reference topography when the object is adhered to the first surface as a result of a change introduced to the fluid connection between the outlet and the first surface.

14. A microscope system according to claim 10, further comprising a vacuum unit operably connectable to the outlet to create variable fluid pressure in the channel.

15. A microscope system according to claim 10, wherein the processor is further programmed to move the first and second microscope objectives along the axis and to acquire the imaging data.

16. A microscope system for imaging an object, the system comprising:
multiple objectives operably connected to one another to enable simultaneous imaging of the object along an optical axis;
a supporting substrate having first and second surfaces and dimensioned to hold the object on the first surface of the supporting substrate, the supporting substrate equipped to force a first surface of the object to substantially conform to the first surface of the supporting substrate as a result of applying a suction force through the substrate to the first surface of the object; and
a set of actuators configured to change a curvature of a second surface of the supporting substrate, the set juxtaposed with the second surface of the supporting substrate;
a tangible non-transitory computer-readable storage medium with a computer-readable program product thereon, said storage medium being operably connected with at least one of the set of actuators and the multiple objectives, the computer-readable program product including
program code for storing, on said storage medium, imaging data representing results of the simultaneous imaging of the object with multiple objectives; and
program code for determining corrective data based on the imaging data, the corrective data representing a map of change of a curvature of the second surface of the supporting substrate.

17. A system according to claim 16, wherein the multiple objectives are spatially cooperated such that their corresponding principal planes are repositioned simultaneously during imaging of the object.

18. A system according to claim 16, wherein the set of actuators is mechanically cooperated with the second surface of the supporting substrate at first ends thereof and anchored in an anchoring frame at second ends thereof, and wherein the supporting substrate further includes an outlet and a channel connecting the first surface of the supporting substrate with the outlet through the body.

19. A system according to claim 16, further comprising a processor operably cooperated with the storage medium and the set of actuators, said processor configured
to apply positive or negative pressure to the first surface of the supporting substrate through said channel to cause flattening of a surface of the object.

* * * * *